United States Patent Office 3,051,624
Patented Aug. 28, 1962

3,051,624
LONG-ACTING HORMONE PREPARATIONS
Ezra Lozinski, Westmount, Quebec, Canada, assignor to Charles E. Frosst & Co., Montreal, Quebec, Canada, a corporation of Quebec
No Drawing. Filed June 1, 1961, Ser. No. 114,045
6 Claims. (Cl. 167—74)

The present invention relates to a composition which has been found highly effective in providing rapid and protracted relief of the menopause, suppression of lactation and for the treatment of osteoporosis.

It is known that certain esters of testosterone, for example, testosterone enanthate and testosterone cyclopentylpropionate have prolonged androgenic activity and that certain esters of estradiol, for example, estradiol dienanthate and estradiol valerate have prolonged estrongenic activity.

It is also well known that combinations of androgens and estrogens are relatively effective in the treatment of the menopause syndrome, in the suppression of lactation and in the treatment of osteoporosis. However, such preparations as are presently available require frequent administration when taken either by the oral or parenteral routes. As an example of such a preparation there may be mentioned a mixture of testosterone enanthate benzilic acid hydrazone and estradiol dienanthate dissolved in oil which was found to relieve the menopausal syndrome and ameliorate osteoporosis. However, when used for the suppression of lactation, such a preparation was found to be ineffective. Furthermore, it was also observed that when administered for the treatment of the symptoms of the menopause, the above preparation did not provide full effects until 3 to 7 days after administration.

In accordance with the present invention it has now been found that the drawbacks of the prior combinations of long-acting androgens and long-acting estrogens available for the treatment of the symptoms of the menopause, suppression of lactation and for the treatment of osteoporosis can be unexpectedly improved by adding thereto a relatively short-acting estrogen.

It has been found that a single injection of the preparation of the present invention is capable of rapid and protracted relief of the symptoms of the menopause, the relief persisting for five to seven weeks and provides marked amelioration in osteoporosis. The novel hormone preparation was also found to be unexpectedly effective for the suppression of lactation in that it makes available a quickly utilized estrogen to prevent the rapidly falling blood estrogen level after delivery of the placenta, and it also supplies a long-acting estrogen and androgen to maintain the lactation inhibitory effect over the critical period and prevents the rebound phenomena often observed when presently available preparations are employed. The hormone preparation of the present invention when used to suppress lactation is given prior to delivery of the placenta.

The suitable long acting androgens which may used in accordance with the present invention are the long acting fatty acid esters of testosterone wherein the ester grouping has at least five carbon atoms. As an example of suitable testosterone esters there may be mentioned testosterone caprylate, testosterone caprinate, testosterone enanthate, testosterone valerianate testosterone undecylenate, testosterone β-cyclopentylpropionate, testosterone, hexahydrobenzoate, and the 3-benzilic acid hydrazone derivatives thereof, for example the 3-benzilic acid hydrazone-17-enanthate testosterone or the 3-benzilic acid hydrazone-17-β-cyclopentylpropionate-testosterone. These long acting testosterone esters are preferably used in a dosage of from about 50 to about 400 mg.

The suitable long acting estrogens which may be used in accordance with the present invention are the mono- or di-fatty acid ester of estradiol wherein the ester grouping has at least four carbon atoms. As an example of suitable estradiol esters there may be mentioned estradiol valerate, estradiol caprylate, estradiol caprinate, estradiol dienanthate, estradiol hexahydrobenzoate, estradiol stearate, and estradiol β-cyclopentylpropionate. The long acting estradiol esters are preferably used in a dosage of from 2.5 to about 15 mg.

The suitable quick acting estrogens which may be used in accordance with the present invention are those which are recognised as such in the prior art, for example, estrone, estradiol, estradiol benzoate and the conjugated estrogens. The quick acting estrogens are preferably used in a dosage of from about 0.5 to about 5.0 mg.

The new hormone preparations of the present invention are prepared by conventional methods, for example, by the use of organic of inorganic liquid carriers such as are suitable for parenteral administration. Suitable carriers are those which do not react with the hormones used. For example, vegetable oils, such as corn oil or sesame oil, polyethylene glycols and others. If desired, the preparations of the present invention may be combined with other therapeutic agents such as local anaesthetics.

The present invention will be more fully understood by referring to the following examples which are given to illustrate rather than limit the scope of the invention.

*Example 1*

| | | |
|---|---|---|
| Testosterone enanthate benzilic acid hydrazone | mg | 100 |
| Estradiol dienanthate | mg | 7.5 |
| Estradiol benzoate | mg | 1 |
| Benzyl alcohol | mg | 10 |
| Sesame or corn oil, q.s | ml | 1 |

The testosterone enanthate benzilic acid hydrazone and estradiol dienanthate are finely ground together and mixed with estradiol benzoate. Then the benzyl alcohol is introduced and the whole heated on a water bath until a solution results. This solution is then diluted with sesame oil or corn oil until 1 cc. of the resulting solution contains exactly the hormones listed above. The solution is then filtered in the customary manner and filled into ampoules or vials and then sterilized in accordance with procedures well known in the art. This preparation is effective for the relief of the menopausal syndrome.

*Example 2*

| | | |
|---|---|---|
| Testosterone enanthate benzilic acid hydrazone | mg | 300 |
| Estradiol dienanthate | mg | 15.0 |
| Estradiol benzoate | mg | 6.0 |
| Benzyl alcohol | mg | 20 |
| Sesame or corn oil, q.s | ml | 2 |

This preparation is particularly effective in the suppression of lactation.

*Example 3*

| | | |
|---|---|---|
| Testosterone enanthate | mg | 150 |
| Estradiol dienanthate | mg | 10 |
| Estradiol benzoate | mg | 1.0 |
| Benzyl alcohol | mg | 10 |
| Sesame or corn oil, q.s | ml | 1 |

This preparation is effective to relieve the menopausal syndrome.

Example 4

| | | |
|---|---|---|
| Testosterone cyclopentyl propionate | mg | 150 |
| Estradiol valerate | mg | 5.0 |
| Estradiol benzoate | mg | 1.0 |
| Benzyl alcohol | mg | 10 |
| Sesame or corn oil, q.s | ml | 1 |

This preparation is effective to relieve the menopausal syndrome.

Example 5

| | | |
|---|---|---|
| Testosterone enanthate benzilic acid hydrazone | mg | 300 |
| Estradiol dienanthate | mg | 15.0 |
| Estradiol | mg | 2.5 |
| Benzyl alcohol | mg | 10.0 |
| Sesame or corn oil, q.s | ml | 2.0 |

This preparation is effective in the suppression of lactation.

Example 6

| | | |
|---|---|---|
| Testostreone cyclopentyl propionate | mg | 150 |
| Estradiol dienthate | mg | 7.5 |
| Estrone | mg | 1.5 |
| Benzyl alcohol | mg | 10.0 |
| Corn oil or sesame oil, q.s | ml | 1.0 |

This preparation is effective to relieve the menopausal syndrome.

Example 7

| | | |
|---|---|---|
| Testosterone enanthate | mg | 180 |
| Estradiol valerate | mg | 8 |
| Estradiol benzoate | mg | 2.5 |
| Benzyl alcohol | mg | 10 |
| Corn oil or sesame oil | ml | 2.0 |

This preparation is particularly effective in the suppression of lactation.

This application is a continuation-in-part of application Serial Number 824,935, filed July 6, 1959, now abandoned, for "Long-Acting Hormone Preparation," Ezra Lozinski, inventor.

I claim:

1. A hormone injection preparation comprising a long acting testosterone fatty acid ester wherein the fatty acid grouping has at least five carbon atoms, a long acting estradiol fatty acid ester wherein the fatty acid grouping has at least four carbon atoms and a quick acting estrogen in a liquid carrier.

2. A hormone injection preparation comprising from about 50 to about 400 mg. of a long acting testosterone fatty acid ester wherein the fatty acid grouping has at least five carbon atoms, from about 2.5 to about 15 mg. of a long acting estradiol fatty acid ester wherein the ester grouping has at least four carbon atoms from about 0.5 to about 6.0 mg. of a quick acting estrogen in a liquid carrier.

3. A hormone injection preparation comprising testosterone enanthate benzilic acid hydrazone, estradiol dienanthate and estradiol benzoate in a liquid carrier.

4. A hormone injection preparation comprising about 300 mg. of testosterone enanthate benzilic acid hydrazone, about 15 mg. of estradiol dienthate and about 6 mg. of estradiol benzoate in a liquid carrier.

5. A hormone injection preparation comprising testosterone enanthate, estradiol dienanthate and estradiol benzoate in a liquid carrier.

6. A hormone injection preparation comprising 180 mg. of testosterone enanthate, 8 mg. estradiol valerate and 2.5 mg. of estradiol benzoate in a liquid carrier.

References Cited in the file of this patent

J.A.M.A., vol. 161, No. 6, June 9, 1956, pages 68 and 69.

Am. J. of Pharmacy, vol. 128, No. 12, December 1956, page 403.